United States Patent
Pohl et al.

(10) Patent No.: US 7,516,036 B2
(45) Date of Patent: Apr. 7, 2009

(54) SYSTEM TESTING AND METHODS THEREFOR

(75) Inventors: William N. Pohl, Morgan Hill, CA (US); Daniel DeFolo, Campbell, CA (US); Robert Kentwortz, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 10/936,616

(22) Filed: Sep. 7, 2004

(65) Prior Publication Data

US 2006/0064278 A1 Mar. 23, 2006

(51) Int. Cl.
*G01M 19/00* (2006.01)
(52) U.S. Cl. .......................... 702/108; 702/187; 714/25
(58) Field of Classification Search ............. 702/57–58, 702/79, 81, 84, 108, 125, 182, 187; 714/25, 714/34–35, 55, 723
See application file for complete search history.

(56) References Cited

U.S. PATENT DOCUMENTS

| | | | | |
|---|---|---|---|---|
| 5,625,288 A | * | 4/1997 | Snyder et al. | ............ 324/158.1 |
| 5,684,726 A | * | 11/1997 | Osborn et al. | ............... 702/123 |
| 6,442,721 B2 | * | 8/2002 | Whetsel | ...................... 714/726 |
| 6,598,182 B1 | * | 7/2003 | Lowitz et al. | .................. 714/39 |
| 6,687,855 B1 | * | 2/2004 | Krech et al. | ................... 714/30 |
| 6,792,393 B1 | * | 9/2004 | Farel et al. | ................... 702/186 |
| 2002/0188888 A1 | * | 12/2002 | Rivoir | ......................... 714/25 |

* cited by examiner

*Primary Examiner*—Eliseo Ramos Feliciano
*Assistant Examiner*—Mary C Baran

(57) ABSTRACT

A computer-implemented method of testing a target system using a stimulus-response test. The method includes obtaining the responses of the target system at predefined monitoring times. Each time the response changes state, a clock is reset, and the elapsed duration is kept from the latest response state change. If the elapsed duration from the last response state change exceeds an expected duration before the next state change, a possible fault is deemed to exist.

23 Claims, 3 Drawing Sheets

SYSTEM TESTING AND METHODS THEREFOR

BACKGROUND OF THE INVENTION

Stress testing has long been performed as part of the quality control process for computer hardware and/or software. During stress testing, the system is stressed in different ways and the response is recorded and analyzed, both for speed and accuracy.

As part of system stress testing, it is oftentimes necessary for the system load to vary between high stress levels and low stress levels in order to simulate real world conditions and/or to test the limits of the system. In the prior art, the stress test is typically allowed to run until a stop event, which may be the completion of the test or a premature termination of the test due to, for example, a system crash. During the time when the stress test is performed, data is logged. When the stop event is encountered, a post-run analysis is performed. That is, the logged data is analyzed after the testing terminates in order to ascertain the performance of the system and the cause for the premature termination, if any.

As systems become more complex, it is not uncommon for a stress test to last the entire day or even multiple days. If the system behaves unacceptably within the first few hours but the test is allowed to proceed until completion before the test data is analyzed, days may be wasted before the problem is uncovered. Furthermore, the execution environment of many hardware and/or software involves the use of transient data and states. If the test is halted at the moment the system begins to behave unacceptably or shortly thereafter, some or much of the transient data and/or states information reflects the condition that cause the error. By retrieving this transient data and/or states information, the source of error may be more rapidly and/or accurately determined. On the other hand, if the test is allowed to proceed much further, such as to completion to facilitate post-run analysis, much or all of the transient data and/or state information related to the error may have been irretrievably lost and is thus of little help to the determination of the source of error.

SUMMARY OF INVENTION

These and other features of the present invention will be described in more detail below in the detailed description of the invention and in conjunction with the following figures.

The invention relates, in an embodiment, to a computer-implemented method of testing a target system using a stimulus-response test. The method includes obtaining at a first preset monitoring time a first response from the target system. The first response represents a response by the target system at the first preset monitoring time to a set of stimuli of the stimulus-response test. The method further includes measuring an elapsed duration from a second preset monitoring time to the first preset monitoring time. The second preset monitoring time is associated with the latest response state change prior to the first preset monitoring time by the target system. The latest response state change represents a transition, between the second preset monitoring time and a preset monitoring time immediately preceding the second preset monitoring time, from a first predefined response level state to a second predefined response level state. The method also includes generating, if the elapsed duration exceeds an expected duration, a first signal indicative of the elapsed duration exceeding the expected duration.

In another embodiment, the invention relates, in an embodiment, to an article of manufacture comprising a program storage medium having computer readable code embodied therein. The computer readable code is configured to test a target system using a stimulus-response test. The article of manufacture includes on the program storage medium computer readable code for obtaining at a first monitoring time a first response from the target system. The first response represents a response by the target system at the first monitoring time to a set of stimuli of the stimulus-response test. The article of manufacture also includes on the program storage medium computer readable code for measuring an elapsed duration from a second monitoring time to the first monitoring time. The second monitoring time is associated with the latest response state change prior to the first monitoring time by the target system. The latest response state change represents a transition, between the second monitoring time and a monitoring time immediately preceding the second monitoring time, from a first predefined response level state to a second predefined response level state. The article of manufacture also includes on the program storage medium computer readable code for generating, if the elapsed duration exceeds an expected duration, a first signal indicative of the elapsed duration exceeding the expected duration.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
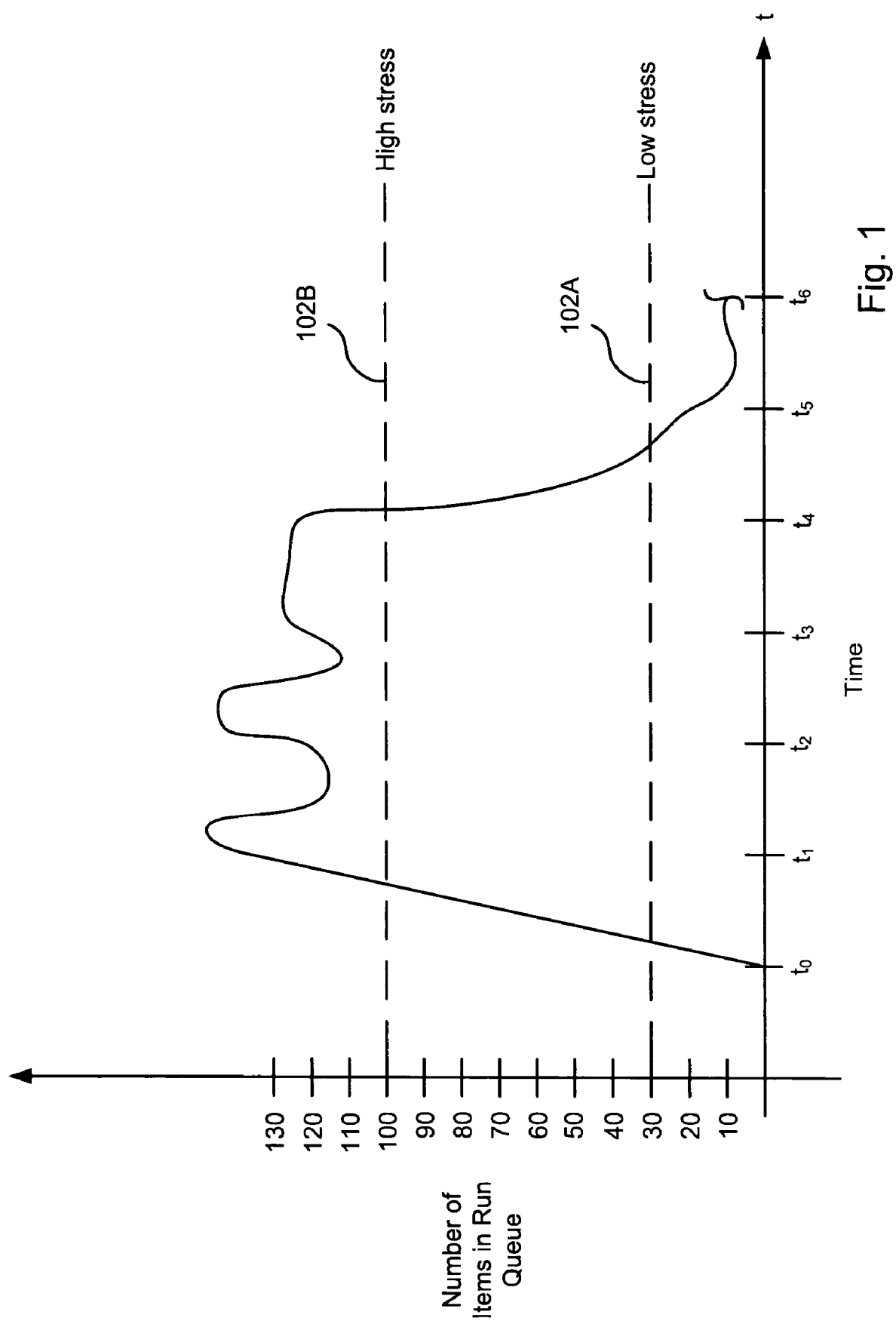
FIG. 1 illustrates an example wherein the test involves monitoring the stress level placed on the run queue of a hypothetical processor.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the invention, there are provided computer-implemented methods for efficiently testing a target system, such as a computer system or network, using a stimulus-response test. The stimulus-response test is designed to furnish stimuli to the test system and obtain responses from the test system over time. To avoid the disadvantages associated with the prior art post-run analysis approach, the response times obtained for state change conditions are measured during testing against expected response times. If the response time obtained from a given state change condition exceeds the expected response time value, a possible fault condition is noted and corrective actions may be taken.

In an embodiment, the stimulus-response test represents a stress test of a computer system, which stress test may be designed to test a software and/or hardware component of the computer system. In a stress test, the stimuli may vary to subject the target system to various levels of low stress and high stress over time. Instead of waiting for the system to crash or waiting until the entire stress test is completed (as in the case with the prior art post-run analysis approach), the invention, in an embodiment, measures the time duration since the last response state change. If the time duration exceeds an expected time duration before the next response state change, a possible fault condition is noted, and corrective actions may be taken.

Corrective actions may include, for example, immediately terminating the test to preserve parameters that exist at the time the fault condition is detected. As mentioned, transient states and data may exist at the time the fault condition is detected. If the test is permitted to proceed in any significant way, the transient states and data may be lost. By terminating the test to log such transient states and data, the testing engineer may be able to more accurately and/or rapidly diagnose the cause for the fault condition.

Since the responses are continually monitored at predefined monitoring times, it is possible to detect a fault condition even before the system crashes or before the test is concluded. For example, if the elapsed duration since the last response state change exceeds an expected duration before the next response state change, the test may be halted early and the fault may be diagnosed and corrected without having to wait until the lengthy test is finished. Of course, as will be discussed later herein, the predefined response levels that establish a state change condition may be chosen using a variety of different metrics.

Determining the existence of a possible fault by measuring the elapsed duration since the last response state change and comparing that elapsed duration against an expected duration value also has the advantage of turning the analysis of any test result, no matter how complicated, into simple Boolean operation. Because this is a simple operation, the computing overhead associated with determining the possible existence of a fault condition is fairly low. The low computing overhead contributes to a higher degree of accuracy in the test result.

The features and advantages of the invention may be better understood with reference to the figures and discussions that follow. FIG. 1 illustrates an example wherein the test involves monitoring the stress level placed on the run queue of a hypothetical processor. In the example of FIG. 1, the presence of 30 items or fewer in the run queue is deemed a low stress level, and the presence of 100 or more items in the run queue is deemed a high stress level. In the example of FIG. 1, the response in term of the run queue length is measured every second.

If the run queue has 0 items at time t0, the response at time t0 may be said to be associated with a low stress level. If a measurement of the run queue indicates that the run queue has 120 items at time t1, the response at time t1 may be said to be associated with the high stress level. Furthermore, assume that the responses from time t1-t4 stay above 100 items, the responses at time t1-t4 may be said to be all associated with the high stress level.

If the run queue has 20 items at time t5, the response is then deemed to be associated with the low stress level. Thus, between time t1 and t5 (or four seconds in this example), the response level state has changed from a high stress level to a low stress level. If the expected duration is six seconds to change from a high stress level to a low stress level, then the shorter elapsed time (e.g., 4 seconds in this example) from high-to-low is acceptable since the response of the system is better than expected. If, on the other hand, the expected duration is only two seconds, an elapsed duration from high-to-low of four seconds indicates that there may be a fault with the system. The same analysis may apply for a response level state change from a low stress level to a high stress level.

Whenever there is a state change condition from one response state level to another response state level, a timer is started to determine how long it would take before the next state change condition. In the example of FIG. 1, time t1-t4 are all associated with the high stress response state level. However, time t1 is the time associated with the last response state change and represents the start time for measuring the elapsed duration. When the response level changes from a high stress response state level of time t4 to the low stress response state level of time t5, the elapsed time is measured from time t1 to t5 (not from time t4 to t5 although the state change condition actually happened between time t4 and t5 as shown in FIG. 1). This is so even if the actual transition occurs between time t5 and the immediately preceding monitoring time t4. At time t5, assuming that the elapsed duration did not exceed the expected duration for the high-to-low transition, the clock is reset and the elapsed duration for the low-to-high transition is measured again starting from time t5.

Since the test depends on the monitored response values obtained at preset monitoring times, transient responses may skew the test result. For example, if the response level is abnormal during the brief time when the response value is monitored, the test result may be inaccurate since such an abnormal response level does not truly indicate the response of the target system. For this reason, statistical calculations may be performed on the measured values to derive the actual response values employed for determining whether a fault exists. In the example of FIG. 1, the value of 20 in the run queue at time t5 may represent an average of the run queue length between time t4 and t5, for example. Thus the test may be made more accurate even if there are transient values in the responses of the target system. Other statistical calculations designed to attenuate (i.e., reduce) the effect of transient values may also be employed.

The exact response levels that define the response states may be determined in various ways. In an embodiment, the stimulus-response test may be run for a short duration, and the responses may be analyzed to determine the appropriate response levels that define the response states. For example, a percentage (e.g., 80% and 20%) of the local maxima and minima values may be employed as the two response levels that define the response states. Once these response levels are ascertained, the remainder of the test may be executed, and the responses may be monitored using the established response state levels to detect possible fault conditions. As another example, a stimulus-response test may be executed on a target system known to function properly to determine the aforementioned response state levels.

Derivations of the monitored values may be employed to establish the response state levels. For example, the slope (or percentage thereof) of the response versus time plot may be employed to establish the response state level. As another example, the change in the slope of the response versus time plot may be employed to establish the response state level. Depending on the target system to be tested and the values to be monitored, any mathematical and/or statistical derivation of the monitored responses may be employed to establish the response state levels.

Figure 2:
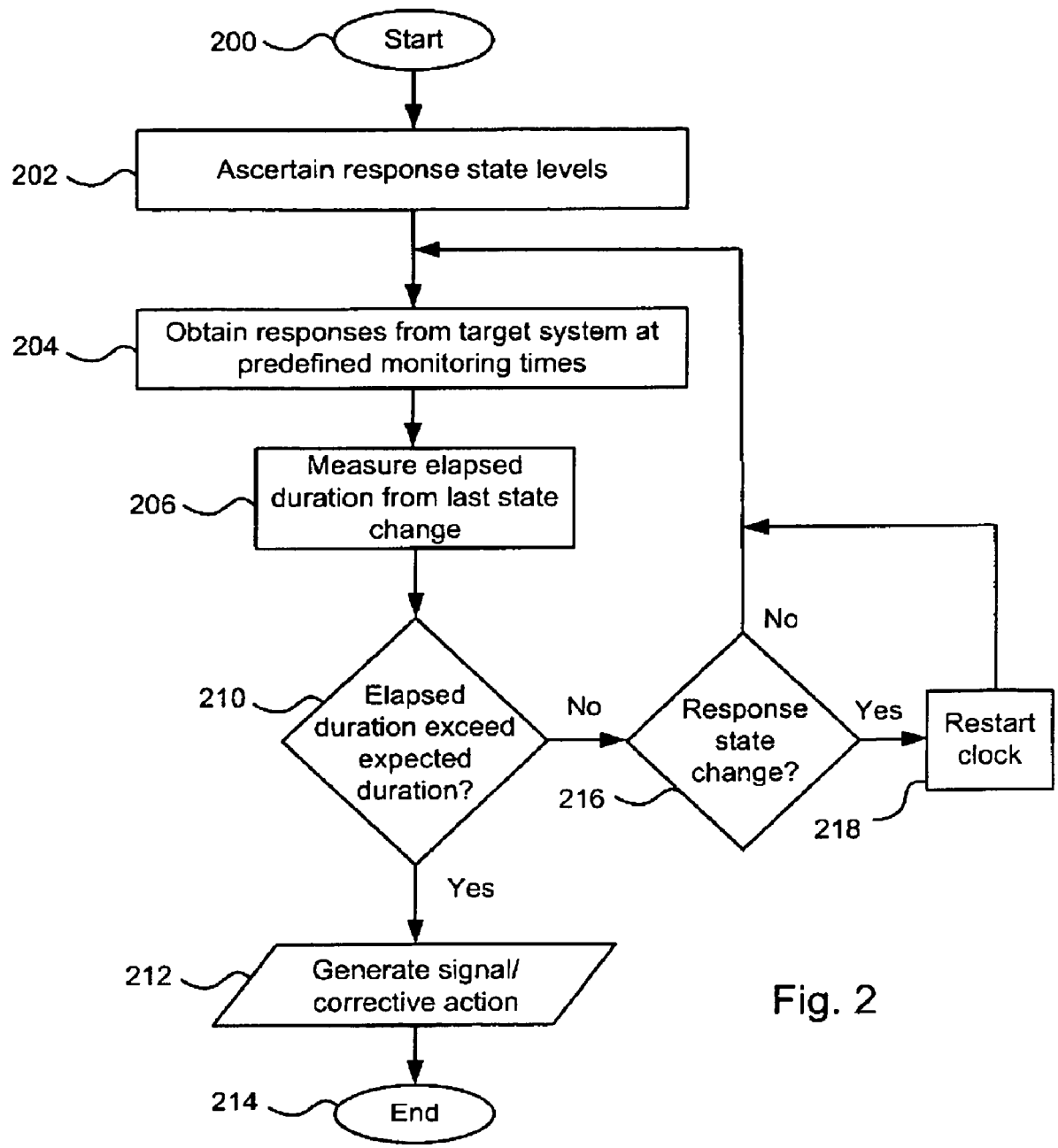
FIG. 2 illustrates, in accordance with an embodiment of the invention, the steps for testing a target system by monitoring response state changes.

FIG. 2 illustrates, in accordance with an embodiment of the invention, the steps for testing a target system by monitoring response state changes. In step 202, the response state levels that trigger response state change determinations are ascertained. For example, these response state levels may be predefined as 30 run queue items and 100 run queue items respectively.

In step 204, the responses from the target system are obtained at predefined monitoring times (e.g., every 1 second, every five seconds, etc.). In step 206, the elapsed duration from the last state change is measured or computed. If there has not been a state change (such as upon system startup), the elapsed duration may be measured from system startup, for example. Once a response state change has been encountered, monitoring starts from that response state change until another response state change is encountered.

If the elapsed duration computed exceeds an expected duration (as determined in step 210) before the next response state change is encountered, a signal may be generated (step 212) to indicate that the elapsed duration exceeds the expected duration. Note that there may be different expected durations depending on whether the elapsed duration is measured from system startup, from a high response state change, or from low response state change, etc. The generation of the signal, which may be a software or a hardware signal, may trigger a corrective action. As mentioned, the corrective action may include, for example, terminating the test, terminating the test while logging system parameters to aid in diagnosing the potential fault, or simply logging system parameters and continuing with the test.

If the elapsed duration does not exceed the expected duration, it is ascertained in block 216 whether the most recently obtained response represents a response state change from the last response state change. For example, the response obtained at time t5 in FIG. 1 would represent a response state change (from high stress to low stress) whereas the response obtained at time t4 would not represent a response state change. If the most recently obtained response represents a response state change, the clock is restarted (step 218), and going forward, the elapsed duration is measured starting from this latest response state change.

Figure 3:
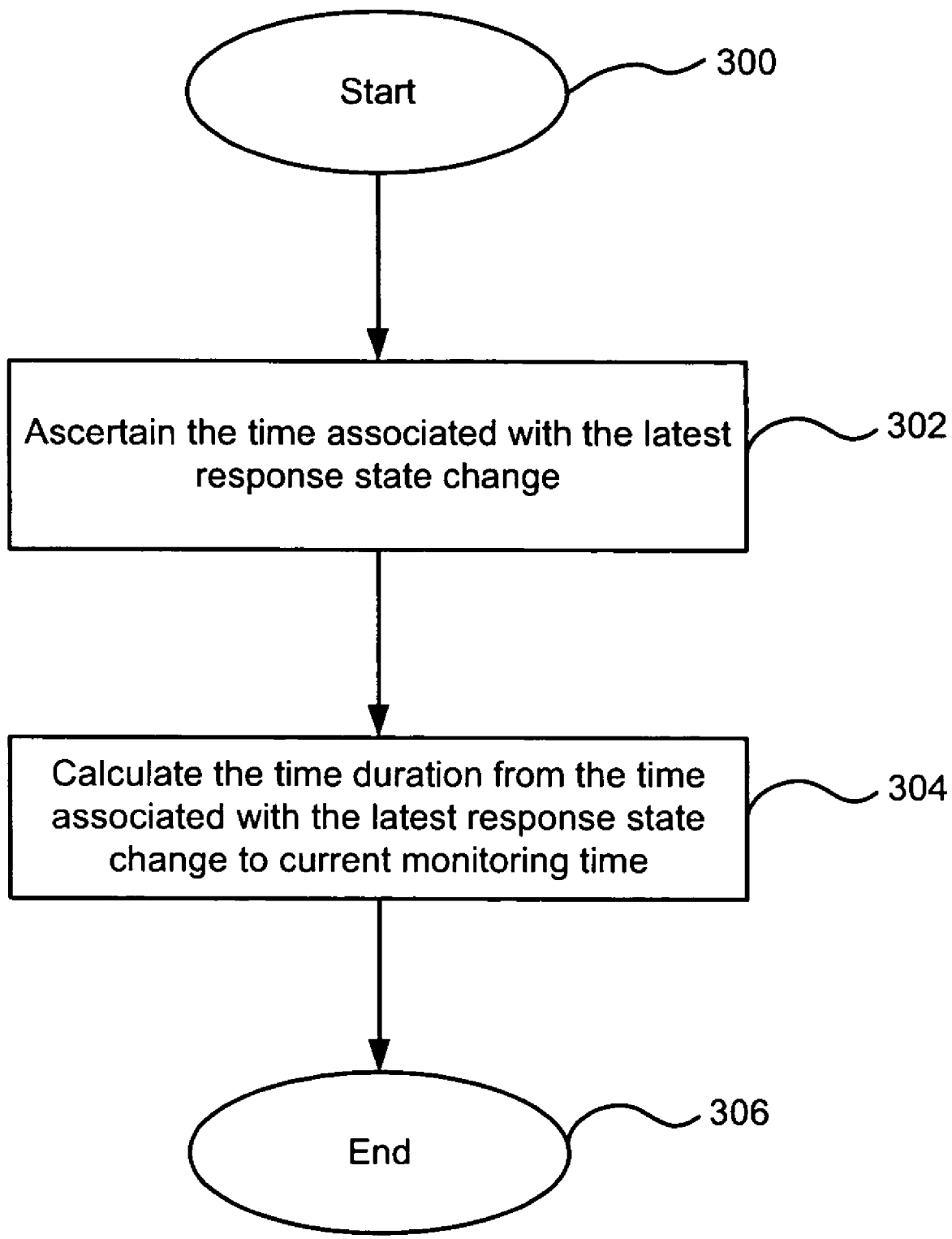
FIG. 3 illustrates, in accordance with an embodiment of the present invention, the steps for determining the elapsed duration since the last response state change.

FIG. 3 illustrates, in accordance with an embodiment of the present invention, the steps for determining the elapsed duration since the last response state change. In steps 302, the last response state change (LRSC) monitoring time is ascertained. With reference to the example of FIG. 1, this last response state change (LRSC) monitoring time represents time t1 any for the high-to-low state change detected during time t5. In step 304, the duration from the last response state change (LRSC) monitoring time to the current monitoring time is determined.

As can be appreciated from the foregoing, embodiments of the invention allow the target system to be monitored during testing by simply comparing the elapsed duration since the last response state change against expected duration. In this manner, a possible fault condition may be detected early on, giving the manufacturer the option of immediately halting the test, collecting data relevant to the fault, and correcting the fault before more time is wasted. As mentioned, since the monitoring involving comparing elapsed duration since the last response state change to the expected duration, the monitoring involves little overhead, thereby enhancing monitoring accuracy.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method of testing a target system using a stimulus-response test, comprising:

obtaining at a first preset monitoring time a first response from said target system, said first response representing a response by said target system at said first preset monitoring time to a set of stimuli of said stimulus-response test;

measuring an elapsed duration from a second preset monitoring time to said first preset monitoring time, said second preset monitoring time being associated with the latest response state change prior to said first preset monitoring time by said target system, said latest response state change representing a transition, between said second preset monitoring time and a preset monitoring time immediately preceding said second preset monitoring time, from a first predefined response level state to a second predefined response level state;

if said elapsed duration exceeds an expected duration, generating a first signal indicative of said elapsed duration exceeding said expected duration; and logging parameters pertaining to said target system responsive to said first signal.

2. The method of claim 1 wherein said first predefined level state represents a high response level state, a response from said target system being deemed associated with said high response level state if said response exceeds a predefined high response level associated with said high response level state.

3. The method of claim 1 wherein said first predefined level state represents a low response level state, a response from said target system being deemed associated with said low response level state if said response is below a predefined low response level associated with said low response level state.

4. The method of claim 1 further comprising terminating said stimulus-response test if said elapsed duration exceeds said expected duration.

5. The method of claim 1 wherein said stimulus-response test represents a stress test, said first predefined level state represents a first one of a high-stress level and a low-stress level, said second predefined level state represents another of said high-stress level and said low-stress level.

6. The method of claim 1 wherein said first predefined level state and said second predefined level state represent percentages of local minima and local maxima data points in a plot of responses versus time from said target system.

7. The method of claim 1 wherein said first response obtained at said first preset monitoring time represents a statistical calculation configured to attenuate the effect of transient responses.

8. The method of claim 7 wherein said statistical calculation includes averaging.

9. The method of claim 1 wherein said first predefined level state and said second first predefined level state are empirically determined from response results from a prior stimulus-response test.

10. The method of claim 1 wherein said first predefined level state and said second predefined level state are empirically determined from responses obtained from executing an initial portion of said stimulus-response test.

11. The method of claim 1 further comprising:

ascertaining whether said first response represents a response state change, said response state change representing a transition, at said first preset monitoring time, from said second predefined response level state to said first predefined response level state.

12. The method of claim 11 further comprising:

resetting a clock for measuring said elapsed duration if said first response represents said response state change.

13. An article of manufacture comprising a program storage medium having computer readable code embodied therein, said computer readable code being configured to test a target system using a stimulus-response test, comprising:

computer readable code for obtaining at a first monitoring time a first response from said target system, said first response representing a response by said target system at said first monitoring time to a set of stimuli of said stimulus-response test;

computer readable code for measuring an elapsed duration from a second monitoring time to said first monitoring time, said second monitoring time being associated with the latest response state change prior to said first monitoring time by said target system, said latest response state change representing a transition, between said second monitoring time and a monitoring time immediately preceding said second monitoring time, from a first predefined response level state to a second predefined response level state;

computer readable code for generating, if said elapsed duration exceeds an expected duration, a first signal indicative of said elapsed duration exceeding said expected duration;

computer readable code for ascertaining whether said first response represents a respond state change, said response state change representing a transition, at said first monitoring time, from said second predefined response level state to said first predefined response level state; and computer readable code for resetting a clock for measuring said elapsed duration if said first response represents said response state change.

14. The article of manufacture of claim 13 wherein said first predefined level state represents a high response level state, a response from said target system being deemed associated with said high response level state if said response exceeds a predefined high response level associated with said high response level state.

15. The article of manufacture of claim 13 wherein said first predefined level state represents a low response level state, a response from said target system being deemed associated with said low response level state if said response is below a predefined low response level associated with said low response level state.

16. The article of manufacture of claim 13 further comprising computer readable code for terminating said stimulus-response test if said elapsed duration exceeds said expected duration.

17. The article of manufacture of claim 13 wherein said stimulus-response test represents a stress test, said first predefined level state represents a first one of a high-stress level and a low-stress level, said second predefined level state represents another of said high-stress level and said low-stress level.

18. The article of manufacture of claim 13 wherein said first predefined level state and said second predefined level state represent percentages of local minima and local maxima data points in a plot of responses versus time from said target system.

19. The article of manufacture of claim 13 wherein said first response obtained at said first monitoring time represents a statistical calculation configured to attenuate the effect of transient responses.

20. The article of manufacture of claim 19 wherein said statistical calculation includes averaging.

21. The article of manufacture of claim 13 wherein said first predefined level state and said second first predefined level state are empirically determined from response results from a prior stimulus-response test.

22. The article of manufacture of claim 13 wherein said first predefined level state and said second predefined level state are empirically determined from responses obtained from executing an initial portion of said stimulus-response test.

23. The article of manufacture of claim 13 further comprising computer readable code for logging parameters pertaining to said target system responsive to said first signal.

* * * * *

UNITED STATES PATENT AND TRADEMARK OFFICE
CERTIFICATE OF CORRECTION

PATENT NO. : 7,516,036 B2
APPLICATION NO. : 10/936616
DATED : April 7, 2009
INVENTOR(S) : William N. Pohl et al.

Page 1 of 1

It is certified that error appears in the above-identified patent and that said Letters Patent is hereby corrected as shown below:

In column 7, line 4, in Claim 9, after "second" delete "first".

In column 7, line 45, in Claim 13, delete "respond" and insert -- response --, therefor.

Signed and Sealed this

Twenty-second Day of September, 2009

David J. Kappos
*Director of the United States Patent and Trademark Office*